US006458892B1

(12) United States Patent
Rajagopalan et al.

(10) Patent No.: US 6,458,892 B1
(45) Date of Patent: *Oct. 1, 2002

(54) MULTILAYER GOLF BALL AND COMPOSITION

(75) Inventors: Murali Rajagopalan, South Dartmouth; Christopher Cavallaro, Lakeville; Kevin M. Harris, New Bedford; Jeffrey L. Dalton, North Dartmouth, all of MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/630,387

(22) Filed: Aug. 1, 2000

Related U.S. Application Data

(63) Continuation-in-part of application No. 08/996,718, filed on Dec. 23, 1997, now Pat. No. 6,124,389, which is a continuation-in-part of application No. 08/606,373, filed on Feb. 23, 1996, now Pat. No. 5,721,304, and a continuation-in-part of application No. 08/746,362, filed on Nov. 8, 1996, now Pat. No. 5,810,678, and a continuation-in-part of application No. 08/706,008, filed on Aug. 30, 1996, now Pat. No. 5,813,923, and a continuation-in-part of application No. 08/603,057, filed on Feb. 16, 1996, now Pat. No. 5,759,676, which is a continuation-in-part of application No. 08/482,522, filed on Jun. 7, 1995, now Pat. No. 5,688,191.

(51) Int. Cl.[7] ............................ A63B 37/00; A63B 37/12
(52) U.S. Cl. .................. 525/92 C; 525/130; 525/440; 525/458; 473/372; 473/373; 473/374
(58) Field of Search .................. 525/92 C, 130, 525/440, 458; 473/372, 373, 374

(56) References Cited

U.S. PATENT DOCUMENTS 4,337,946 A * 7/1982 Saito et al. .................. 273/225
4,431,193 A * 2/1984 Nesbitt .................... 273/235 R
4,625,964 A * 12/1986 Yamada ........................ 273/62
4,650,193 A * 3/1987 Molitor et al. .............. 273/228
4,714,253 A * 12/1987 Nakahara et al. ........... 273/228
4,781,383 A * 11/1988 Kamada et al. ............. 273/228
4,848,770 A * 7/1989 Shama ........................ 273/228
4,863,167 A * 9/1989 Matsuki et al. ............... 273/62
4,919,434 A * 4/1990 Saito ...................... 273/235 R
4,979,746 A * 12/1990 Gentiluomo ................. 273/220
5,002,281 A * 3/1991 Nakahara et al. ........... 273/228
5,026,067 A * 6/1991 Gentiluomo ................. 273/220
5,072,944 A * 12/1991 Nakahara et al. ........... 273/220
5,096,201 A * 3/1992 Egashira et al. ............ 273/218
5,104,126 A * 4/1992 Gentiluomo ................. 273/228
5,184,828 A * 2/1993 Kim et al. .................. 273/228
5,253,871 A * 10/1993 Viollaz ....................... 273/228
5,314,187 A * 5/1994 Proudfit ................... 273/235 R
5,368,304 A * 11/1994 Sullivan et al. ............. 273/220
5,439,227 A * 8/1995 Egashira et al. ............ 273/228
5,553,852 A * 9/1996 Higuchi et al. ............. 473/373
5,556,098 A * 9/1996 Higuchi et al. ............. 473/373
5,586,950 A * 12/1996 Endo .......................... 473/356
5,601,502 A * 2/1997 Hiraoka et al. ............. 473/373
5,681,898 A * 10/1997 Pocklington ................ 525/193
5,688,191 A * 11/1997 Cavallaro et al. ........... 473/373
5,721,304 A * 2/1998 Pasqua, Jr. .................. 524/433
5,759,676 A * 6/1998 Cavallaro et al. ........... 428/215
5,803,831 A * 9/1998 Sullivan
5,810,678 A * 9/1998 Cavallaro
6,042,488 A * 3/2000 Sullivan
6,124,389 A * 9/2000 Cavallaro

* cited by examiner

Primary Examiner—David J. Buttner
(74) Attorney, Agent, or Firm—Swidler Berlin Shereff Friedman, LLP

(57) ABSTRACT

A golf ball comprising a core, a cover, and at least one intermediate layer disposed between the core and the cover, wherein the core has a compression of less than about 60 and the intermediate layer is formed from a blend comprising a polyurethane material, wherein the golf ball has a compression of about 75 to about 85.

49 Claims, No Drawings

US 6,458,892 B1

MULTILAYER GOLF BALL AND COMPOSITION

This application is a continuation-in-part of U.S. patent application Ser. No. 08/996,718, filed Dec. 23, 1997, now U.S. Pat. No. 6,124,389, which is a continuation-in-part of U.S. patent application Ser. No. 08/606,373, filed Feb. 23, 1996, now U.S. Pat. No. 5,721,304, and also a continuation-in-part of U.S. patent application No. 08/746,362, filed Nov. 8, 1996, now U.S. Pat. Nos. 5,810,678, 08/706,008, filed Aug. 30, 1996, now U.S. Pat. No. 5,813,923, and 08/603,057, filed Feb. 16, 1996, now U.S. Pat. No. 5,759,676, which are continuation-in-part applications of U.S. patent application Ser. No. 08/482,522, filed Jun. 7, 1995, now U.S. Pat. No. 5,688,191, the entire disclosures of which are incorporated herein by reference.

FIELD OF THE INVENTION

This invention relates generally to golf balls, and more specifically, to a multilayer golf ball. In particular, this invention relates to a golf ball having a core, a cover and at least one intermediate layer disposed between the core and cover, wherein the intermediate layer is formed from a blend comprising thermoplastic or thermoset polyurethanes. The multilayer golf balls of the present invention have been found to provide the distance and durability characteristics approaching that of a conventional two piece ball while also providing the feel and "click" similar to that of a conventional wound golf ball.

BACKGROUND OF THE INVENTION

Conventional golf balls can be divided into two general types or groups: two piece balls or three piece balls, the latter including wound balls. The difference in play characteristics resulting from these different types of constructions can be quite significant.

Balls having a two piece construction are generally most popular with the average recreational golfer because they provide a very durable ball while also providing maximum distance. Two piece balls are made with a single solid core, usually formed of a crosslinked rubber, which is encased by a cover material. Typically the solid core is formed of polybutadiene which is chemically crosslinked with zinc diacrylate and/or similar crosslinking agents and is covered by a tough, cut-proof blended cover. The cover is generally formed of a material such as SURLYN®, which is a trademark for an ionomer resin produced by DuPont. The combination of the core and cover materials provide a "hard" ball that is virtually indestructible by golfers. Further, such a combination imparts a high initial velocity to the ball which results in improved distance. Because the materials of which the ball is formed are very rigid, two piece balls have a hard "feel" when struck with a club. Likewise, due to their hardness, these balls have a relatively low spin rate which provides greater distance.

At the present time, the wound ball remains the preferred ball of the more advanced players due to its spin and feel characteristics. Wound balls typically have either a solid rubber or liquid center core around which many yards of a stretched elastic thread or yarn are wound. The wound core is then covered with a durable cover material such as a SURLYN® or similar material or a softer cover such as balata or polyurethane. Wound balls are generally softer and provide more spin than non-would balls, which enables a skilled golfer to have more control over the ball's flight and final position. Particularly, with approach shots into the green, the high spin rate of soft, wound balls enables the golfer to stop the ball very near its landing position.

Manufacturers place a great deal of emphasis on producing golf balls that consistently achieve the highest possible initial velocity without exceeding the United States Golf Association's ("USGA") limit of 77.7 m/s (255 ft/s) when struck with a driver with a clubhead speed of 39.6 m/s (130 ft/s). In an effort to meet the demands of the marketplace, manufacturers strive to produce golf balls having initial velocities as close as possible to the USGA initial velocity maximum, and yet maintain an acceptable feel and compression.

A number of patents have been issued which are directed towards modifying the properties of a conventional two piece ball by altering the typical single layer core and single cover layer construction to provide a multi-layer ball having such as a dual cover layer, dual core layer and/or a ball having a mantle layer disposed between the cover and the core. The inventions disclosed in the prior art patents are directed towards improving a variety such golf balls' physical properties and "in-play" characteristics.

Several patents are directed towards improving the carry distance of such balls. For example, U.S. Pat. No. 4,863,167 relates to a three piece solid golf ball having increased flight distance, wherein the ball has a center portion and an outer layer formed from a rubber composition, wherein the outer layer is harder than the center portion and further contains a gravity filler so as to impart a higher specific gravity to the outer layer than that of the center portion. U.S. Pat. No. 5,184,828 relates to a solid three-piece golf ball having improved rebound characteristics and carry distance while maintaining an adequate spin rate, wherein these characteristics are obtained by controlling the size of the polybutadiene inner core and outer layer as well as their specific gravity and hardness. According to the '828 patent, the key to obtaining the desired rebound characteristics is that the maximum hardness (42–62 Shore D) must be located at the interface between the core and the mantle and the hardness must then decrease both inwardly and outwardly. U.S. Pat. No. 4,714,253 is also directed towards a three-piece golf ball having an excellent rebound coefficient. This golf ball has a core with a Shore C hardness of 57–80 in its center, but not more than 83 Shore C at a distance between 5–10 mm from its center and an outer layer with a Shore C hardness of 70–83.

Additionally, there are a number of patents directed towards improving the spin, click and feel of solid balls while maintaining the distance provided by the solid construction. For example, U.S. Pat. No. 5,072,944 discloses a three-piece solid golf ball having a center layer and an outer layer which are prepared from a rubber composition, wherein it is desirable that the center core layer is softer than the outer layer, the layers having a hardness (Shore C) of 25–50 and 70–90, respectively.

U.S. Pat. No. 4,625,964 relates to a solid golf ball having a polybutadiene rubber core of a diameter not more than 32 mm, a polybutadiene rubber intermediate layer having a specific gravity of lower than that of the core material, and a cover. U.S. Pat. No. 4,650,193 is directed towards a solid golf ball having a core comprising a central portion and an integral outer layer, wherein the core is a curable elastomer such as polybutadiene which is treated with a cure altering agent to soften an outer layer of the core, to produce a central layer with a hardness (Shore C) of greater than 75 and an outer layer with a hardness (Shore A) of less than 80.

U.S. Pat. No. 4,848,770 discloses a non-wound three-piece golf ball which includes a core of a highly filled synthetic rubber or polymeric material, an intermediate mantle of an unfilled synthetic rubber and a cover. The core and intermediate mantle have a hardness of between 50–95 Shore D. U.S. Pat. No. 5,002,281 is directed towards a three-piece solid golf ball which has an inner core having a hardness of 25–70 (Shore C), an outer shell having a hardness of 80–95 (Shore C) and a cover. Further, the specific gravity of the inner core must be greater than 1.0, but less than or equal to that of the outer shell, which must be less than 1.3.

The prior art discloses a variety of materials other than polybutadiene for use as intermediate layers. For example, U.S. Pat. No. 5,253,871 concerns a golf ball having a three piece structure comprising an elastomer core, an intermediate layer of a thermoplastic material containing at least 10% of ether block copolymer, preferably blended with an ionomer, and a thermoplastic cover. U.S. Pat. No. 5,681,898 is directed to a multilayer golf ball having a conventional polybutadiene core, an ionomer cover and an intermediate layer formed from a blend of an ethylene methacrylic acid copolymer and a vulcanizate formed from polybutadiene and a peroxide curing agent. U.S. Pat. Nos. 5,439,227 and 5,556,098 both disclose multilayer golf balls which have a conventional polybutadiene core, conventional covers and an intermediate layer formed from a polyetherester block copolymer filled with zinc oxide and optionally blended with an ionomer.

Further, there are also several patents which are directed to golf balls having multiple cover layers. For example U.S. Pat. No. 4,431,193 relates to a golf ball having a multilayer cover wherein the inner layer is a hard, high flexural modulus ionomer resin and the outer layer is a soft, low flexural modulus ionomer resin, and wherein either or both layers may comprise a foamed ionomer resin. U.S. Pat. No. 5,314,187 also relates to golf balls having a multiple layer cover, wherein the outer layer is molded over the inner layer and comprises a blend of balata and an elastomer and the inner layer is an ionomer resin. U.S. Pat. No. 4,919,434 is directed towards a golf ball having a cover which comprises an inner layer and an outer layer each of which comprise a thermoplastic resin, preferably the layers comprise of materials that are capable of fusion bonding with each other.

However, none of the patents discussed above disclose a multilayer ball which employs the materials and has the improved physical properties as disclosed herein.

SUMMARY OF THE INVENTION

The present invention is directed towards a golf ball comprising a core, a cover, and at least one intermediate layer disposed between the core and the cover; and wherein the intermediate layer is formed from a composition comprising at least one thermoplastic or thermoset polyurethane material, wherein the golf ball has a compression of about 75 to of less than about 85. In one embodiment, the golf ball has a compression of about 75 to about 85. about 85. In a preferred embodiment, the cover has a hardness of about 60 to about 72 Shore D.

In one embodiment, the intermediate layer has a hardness of between about 35 and 60 Shore D. In another embodiment, the cover hardness and the intermediate layer hardness have a first ratio from about 1.2 to about 2.1. In still another embodiment, the core has a hardness such that a second ratio of the intermediate layer hardness to the core hardness is about 0.64 to about 0.91. In a preferred embodiment, the core hardness is less than about 80 Shore C.

Preferably, the intermediate layer has a Shore D hardness of about 37 to about 45 and a flexural modulus of at least about 10,000 psi. In one embodiment, the composition is solely thermoplastic polyurethane material. In another embodiment, the intermediate layer composition further comprises an ethylene methacrylic/acrylic acid copolymer.

In another embodiment, the intermediate layer further comprises additional thermoplastic material selected from the group consisting of polyesterester block copolymers, polyetherester block copolymers, polyetheramide block copolymers, ionomer resins, dynamically vulcanized thermoplastic elastomers, styrene-butadiene elastomers with functional groups such as maleic anhydride or sulfonic acid attached, thermoplastic polyesters, polymers formed using a metallocene catalyst, and mixtures thereof. Preferably, the thermoplastic or thermoset polyurethane material is present in an amount from about 25 to about 75 percent by weight.

In still another embodiment, the composition further comprises a second thermoplastic or thermoset polyurethane. Preferably, the intermediate layer has a thickness no greater than about 0.125 inches. In another embodiment, the intermediate layer has a specific gravity of at least about 1.14. In a preferred embodiment, the intermediate layer has a specific gravity of greater than 1.2. In yet another embodiment, the blend further comprises a density-adjusting filler. Preferably, the filler comprises barium sulfate, zinc oxide, titanium dioxide, and mixtures thereof. If a filler is present, it preferably comprises zinc oxide present in an amount from about 5 to about 40 weight percent.

In another embodiment, the core has a specific gravity of about 1 to about 1.2. Additionally, it is preferred that the core has a diameter of no greater than about 1.51 inches. In still another embodiment, the core has a Shore C hardness of less than about 80. Preferably, the core comprises a blend of polybutadiene and calcium oxide, and the at least one intermediate layer comprises the polyurethane material present in an amount of about to about 75 weight percent, a copolymer of ethylene and methacrylic acid present in an amount from about 10 to about 50 weight percent, and zinc oxide present in an amount from about 20 to about 30 weight percent. Additionally, it is preferred that the cover comprises a blend of at least one ionomer.

The present invention is also directed to a golf ball comprising a core, a cover, and at least one intermediate layer disposed between the core and the cover, wherein the core has a hardness of less than about 80 Shore C; and the intermediate layer is formed from a blend comprising a thermoplastic polyurethane material, wherein the golf ball has a compression of about 75 to about 85, and wherein the intermediate layer has a hardness of between about 35 and about 50 Shore D. Preferably, the cover has a hardness of about 60 to about 72 Shore D.

In one embodiment, the core has a Bashore resilience of between about 30 to about 80. Preferably, the core resilience is between about 40 and about 70. In another embodiment, the intermediate layer has a Bashore resilience of between about 35 and about 75. Preferably, the intermediate layer resilience is between about 60 and about 70.

The present invention is also directed to a golf ball comprising a solid core, an intermediate layer, and a cover, wherein the solid core has a diameter of between about 1.25 and about 1.51 inches and a specific gravity of between about 1 and 1.2; wherein the intermediate layer comprises a polyurethane resin and has a hardness of between about 20 and about 60 Shore D and a specific gravity of greater than about 1.2 and greater than that of the solid core; and wherein the cover comprises an ionomer resin and has a thickness greater than about 0.04 inches and a hardness of between about 60 and about 72 Shore D.

In one embodiment, the core diameter is between about 1.3 and about 1.48 inches. In another embodiment, the intermediate layer has a specific gravity of between about 1.21 and about 1.3. Preferably, the intermediate layer has a specific gravity of between about 1.23 and about 1.29. In another embodiment, the cover thickness is between about 0.04 and about 0.41 inches. In still another embodiment, the intermediate layer has a thickness of between about 0.02 and about 0.125 inches. In a preferred embodiment, the intermediate layer has a diameter of between about 1.27 and about 1.64 inches.

The present invention is also directed to a golf ball comprising a core, a cover of at least one layer, and at least one intermediate layer disposed between the core and the cover; wherein the intermediate layer is formed from a composition comprising at least one thermoplastic or thermoset polyurethane material, and has a thickness of about 0.025 to about 0.125 inches, an outer diameter of about 1.41 inches to about 1.68 inches, and a Shore D hardness of less than about 60; and wherein the golf ball has a compression of less than about 85, preferably from about 75 to about 85. In one embodiment, the core diameter is from about 1.25 inches to about 1.63 inches. In a preferred embodiment, the cover has a Shore D hardness of about 68 to about 72. In another embodiment, the ratio of the cover material hardness to the intermediate layer material hardness is greater than about 1.

DETAILED DESCRIPTION OF THE PREFERRED EMBODIMENTS

The following terms that are used in this application are defined in terms of the enumerated ASTM tests:

| | |
|---|---|
| Specific gravity | ASTM D-297[1] |
| Flexural (Flex) Modulus | ASTM D-790[2] |
| Shore D Hardness | ASTM D-2240 |
| Shore C Hardness | ASTM D-2240 |

[1]Tests were carried out in lab conditions where temperature was controlled to 20–23° C. Humidity was not controlled.
[2]Tests were carried out using a 0.5 in/min cross-head speed and a 2 inch span length in the three point bending mode. Test samples were annealed at 23° C. and 50% Relative Humidity for 40 hours.

As used herein, the terms "points" or "compression points" refer to the compression scale or the compression scale based on the ATTI Engineering Compression Tester. This scale, which is well known to those working in this field, is used in determining the relative compression of a core or ball. Some artisans use the Reihle compression scale instead of the standard compression scale. Based on disclosure in U.S. Pat. No. 5,368,304, column 20, lines 55–53 it appears that Reihle compression values can be converted to compression values through the use of the following equation:

compression value=160−Reihle compression value.

As used herein, "COR" refers to Coefficient of Restitution, which is obtained by dividing a ball's rebound velocity by its initial (i.e., incoming) velocity. This test is performed by firing the samples out of an air cannon at a vertical steel plate over a range of test velocities (from 75 to 150 ft/s). A golf ball having a high COR dissipates a smaller fraction of its total energy when colliding with the plate and rebounding therefrom than does a ball with a lower COR. Unless otherwise noted, the COR values reported herein are the values determined at an incoming velocity of 125 ft/s.

As used herein, the term "copolymer" refers to a polymer which is formed from two or more monomers.

As used herein, the term "pph" in connection with a batch formulation refers parts by weight of the constituent per hundred parts of the base composition (e.g., elastomer).

The present invention is directed to an improved multilayer golf ball which comprises a core, a cover, and at least one intermediate layer disposed between the core and the cover, wherein such golf ball provides a softer feel similar to a conventional wound ball, while also providing the distance, durability and spin rates of a conventional two-piece ball. As discussed in detail below, the improved multilayer golf ball of the present invention is provided by forming a ball having various structural components (e.g. cover, core, intermediate layer) each having desired properties and which may be formed from a variety of materials.

The Core

Many conventional two-piece "distance" golf balls are formed with cores having a high compression (e.g., greater than about 90) in order to achieve the desired high finished ball COR and initial velocity necessary to obtain long overall distance for the ball. Balls having such high compression cores typically have a hard feel when struck with a golf club.

However, the golf balls of the present invention are formed with a core having a low compression, but still exhibit a finished ball COR and initial velocity approaching that of conventional two-piece distance balls. Preferably, the cores employed in the golf balls of the present invention have a compression of less than about 60, more preferably about 45 to about 60 and most preferably about 50 to 55. Likewise, it is preferred that the finished balls made with such cores have a COR, measured at an inbound speed of 125 ft./s., of about 0.795 to about 0.815, more preferably about 0.797 to about 0.812 and most preferably about 0.800 to about 0.810.

Additionally, it is preferred the core has a Shore C hardness of about 65 to about 80, more preferably about 68 to about 75 and most preferably about 72 to about 75.

The cores employed in the golf balls of the present invention preferably have a diameter of about 1.25 inches to about 1.51 inches, more preferably about 1.30 inches to about 1.48 inches and most preferably about 1.39 inches. The overall diameter of the core and the intermediate layer is about 84 percent to about 97 percent of the overall diameter of the finished ball.

A representative base composition for forming the cores employed in the present invention comprises polybutadiene and, in parts by weight based on 100 parts polybutadiene, 20–50 parts of a metal salt diacrylate, dimethacrylate, or monomethacrylate, preferably zinc diacrylate. The polybutadiene preferably has a cis-1,4 content of above about 90% and more preferably above about 96%. Commercial sources of polybutadiene include Shell 1220 manufactured by Shell Chemical, NEOCIS® BR40 manufactured by Enichem Elastomers, and UBEPOL® BR150 manufactured by Ube Industries, Ltd. If desired, the polybutadiene can also be mixed with other elastomers known in the art, such as natural rubber, styrene butadiene, and/or isoprene in order to further modify the properties of the core. When a mixture of elastomers is used, the amounts of other constituents in the core composition are usually based on 100 parts by weight of the total elastomer mixture.

Metal salt diacrylates, dimethacrylates, and monomethacrylates suitable for use in the cores employed in this invention include those wherein the metal is magnesium, calcium, zinc, aluminum, sodium, lithium or nickel. Zinc diacrylate is preferred, because it provides golf balls with a high initial velocity in the United States Golf Association ("USGA") test. The zinc diacrylate can be of various grades of purity. For the purposes of this invention, the lower the quantity of zinc stearate present in the zinc diacrylate the higher the zinc diacrylate purity. Zinc diacrylate containing less than about 10% zinc stearate is preferable. More preferable is zinc diacrylate containing about 4–8% zinc stearate. Suitable, commercially available zinc diacrylates include those from Rockland React-Rite and Sartomer. The preferred concentrations of zinc diacrylate that can be used are 20–50 pph based upon 100 pph of polybutadiene or alternately, polybutadiene with a mixture of other elastomers that equal 100 pph.

Free radical initiators are used to promote cross-linking of the metal salt diacrylate, dimethacrylate, or monomethacrylate and the polybutadiene. Suitable free radical initiators for use in the invention include, but are not limited to peroxide compounds, such as dicumyl peroxide; 1,1-di(t-butylperoxy) 3,3,5-trimethyl cyclohexane; bis (t-butylperoxy) diisopropylbenzene; 2,5-dimethyl-2,5 di (t-butylperoxy) hexane; or di-t-butyl peroxide; and mixtures thereof. Other useful initiators would be readily apparent to one of ordinary skill in the art without any need for experimentation. The initiator(s) at 100% activity are preferably added in an amount ranging between about 0.05 and 2.5 pph based upon 100 parts of butadiene, or butadiene mixed with one or more other elastomers. More preferably, the amount of initiator added ranges between about 0.15 and 2 pph and most preferably between about 0.25 and 1.5 pph.

Typical prior art golf ball cores incorporate 5 to 50 pph of zinc oxide (ZnO) in a zinc diacrylate-peroxide cure system that cross-links polybutadiene during the core molding process. However, in the present invention it is preferred that the ZnO in the core composition is eliminated in favor of calcium oxide (CaO). Cores produced from an admixture containing CaO have been found to exhibit desirable performance properties. In particular, when ZnO is replaced with CaO, it has been observed that the initial velocity and COR of the core is maintained, but the compression of the core is reduced by at least about 4 compression points on the standard compression scale, and may be reduced as much as 6 points. Additionally, the combination of the use of calcium oxide and a higher percentage of zinc diacrylate can be used to maintain the same compression as with the zinc oxide, but the initial velocity and COR is significantly increased. Thus, by using calcium oxide, either the core compression can be lowered and the initial velocity and COR maintained or the amount of zinc diacrylate can be increased so that the core compression is the same and the initial velocity and COR is increased.

Typically the calcium oxide added to the core-forming composition employed in the present invention is in the range of about 0.1 to 15, preferably 1 to 10, most preferably 1.25 to 5, parts calcium oxide per hundred parts of polybutadiene.

The core compositions employed in the present invention may also include fillers, added to the elastomeric composition to adjust the density and/or specific gravity of the core. As used herein, the term "fillers" includes any compound or composition that can be used to vary the density and other properties of the subject golf ball core. Fillers useful in the golf ball core according to the present invention include, for example, zinc oxide (in an amount significantly less than that which would be necessary without the addition of the calcium oxide), barium sulfate, and regrind (which is recycled core molding matrix ground to 30 mesh particle size). The amount and type of filler utilized is governed by the amount and weight of other ingredients in the composition, since a maximum golf ball weight of 1.620 oz has been established by the USGA. Appropriate fillers generally used range in specific gravity from about 2.0 to 5.6. In the preferred golf ball, the amount of filler in the core is lower than that of a typical golf ball such that the specific gravity of the core is decreased.

The preferred range of specific gravities of the cores employed in the present invention is from about 1.0 to about 1.2, more preferably in the range of about 1.1 to about 1.18, depending upon the size of the core, cover, intermediate layer and finished ball, as well as the specific gravity of the cover and intermediate layer.

Other ingredients such as accelerators, e.g. tetra methylthiuram, processing aids, processing oils, plasticizers, dyes and pigments, antioxidants, as well as other additives well known to the skilled artisan may also be used in the present invention in amounts sufficient to achieve the purpose for which they are typically used.

The Intermediate Layer

The intermediate layer may comprise up to 100% by weight of a dynamically vulcanized thermoplastic elastomer, a functionalized styrene-butadiene elastomer, a thermoplastic polyurethane, a metallocene polymer or blends thereof. In a preferred embodiment of the present invention, the intermediate layer comprises a thermoplastic or thermoset polyurethane.

In another preferred embodiment of the present invention, the intermediate layer is a blend of a first and a second component wherein the first component is a dynamically vulcanized thermoplastic elastomer, a functionalized styrene-butadiene elastomer, a thermoplastic or thermoset polyurethane or a metallocene polymer and the second component is a material such as a thermoplastic or thermoset polyurethane, a thermoplastic polyetherester or polyetheramide, a thermoplastic ionomer resin, a thermoplastic polyester, another dynamically vulcanized elastomer, another a functionalized styrene-butadiene elastomer, another a metallocene polymer or blends thereof. In a more preferred embodiment, at least one of the first and second components comprises a thermoplastic or thermoset polyurethane.

In another preferred embodiment, the intermediate layer of the golf balls of the present invention is formed from a blend which comprises an ethylene methacrylic/acrylic acid copolymer. Below is a non-limiting example of the chemical structure for suitable ethylene methacrylic/acrylic acid copolymers:

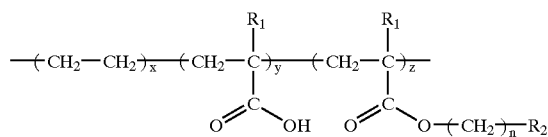

wherein x=50 to 99%;
  y=1 to 50%;
  z=0 to 49%;
  $R_1$=H or $CH_3$; $R_2$=$CH_3$ or isobornyl; and
  n=0 to 12.

Specific acid-containing ethylene copolymers include ethylene/acrylic acid; ethylene/methacrylic acid; ethylene/ acrylic acid/n- or isobutyl acrylate; ethylene/methacrylic acid/n- or iso-butyl acrylate; ethylene/acrylic acid/methyl acrylate; ethylene/methacrylic acid/methyl acrylate; ethylene/acrylic acid/iso-bornyl acrylate or methacrylate and ethylene/methacrylic acid/isobornyl acrylate or methacrylate. Suitable ethylene methacrylic/acrylic acid copolymers are sold commercially by DuPont under the tradename NUCREL®, with NUCREL® 960, NUCREL® RX9-1, and 010 being preferred.

In another embodiment of the present invention, the intermediate layer is formed from a blend which comprises an ethylene methacrylic/acrylic acid copolymer and a second component which comprises a thermoplastic material. Suitable thermoplastic materials for use in the intermediate blend include, but are not limited to, polyesterester block copolymers, polyetherester block copolymers, polyetheramide block copolymers, ionomer resins, dynamically vulcanized thermoplastic elastomers, styrene-butadiene elastomers with functional groups such as maleic anhydride or sulfonic acid attached, thermoplastic polyurethanes, thermoplastic polyesters, polymers formed using a metallocene catalyst ("metallocene polymers") and/or blends thereof.

Suitable thermoplastic polyetheresters include materials which are commercially available from DuPont under the tradename HYTREL® and include HYTREL® 3078, HYTREL® G3548W and HYTREL® G4078W. Suitable thermoplastic polyetheramides are commercially available from Elf-Atochem of Philadelphia, Pa, under the tradename PEBAX® and include PEBAX® 2533, PEBAX® 1205 and PEBAX® 4033. Suitable thermoplastic ionomer resins include any number of olefinic based ionomers such as SURLYN®, available from E. I. DuPont de Nemours and Co., of Wilmington, Del., and IOTEK®, available from Exxon Corporation of Houston, Tex. Suitable dynamically vulcanized thermoplastic elastomers include SANTOPRENE®, SARLINK®, VYRAM®, DYTRON® and VISTAFLEX®. SANTOPRENE® is the trademark for a dynamically vulcanized PP/EPDM. SANTOPRENE® 203-40 is an example of a preferred SANTOPRENE® and is commercially available from Advanced Elastomer Systems. Examples of suitable functionalized styrene-butadiene elastomers, i.e., styrene-butadiene elastomers with functional groups such as maleic anhydride or sulfonic acid, include KRATON FG-1901x and FG-1921x, which are available from the Shell Corporation of Houston, Tex. Examples of suitable thermoplastic polyurethanes include ESTANE® 58133, ESTANE® 58134 and ESTANE® 58144, which are commercially available from the B. F. Goodrich Company of Cleveland, Ohio. Suitable metallocene polymers, i.e., polymers formed with a metallocene catalyst include those commercially available from Sentinel Products of Hyannis, Mass. Suitable thermoplastic polyesters include polybutylene terephthalate.

Preferably, the second component of the intermediate layer blend comprises polyetherester block copolymer, with HYTREL® 3078 being a particularly preferred polyetherester block copolymer.

Many prior art intermediate layers generally have a specific gravity of about 1 or less. However, in a preferred embodiment, the intermediate layer employed in the golf balls of the present invention has a specific gravity greater than 1.2, preferably about 1.21 to about 1.30, more preferably about 1.23 to about 1.29 and most preferably about 1.27.

The desired specific gravity of the intermediate layer may be obtained by adding a filler such as barium sulfate, zinc oxide, titanium dioxide and combinations thereof to the intermediate layer blend. Zinc oxide is the preferred filler.

The intermediate layers of the present invention are formed from an intermediate layer blend comprising up to 100 percent by weight of an ethylene methacrylic/acrylic acid copolymer. In a preferred embodiment of the present invention, the intermediate layer is formed from a blend of about 1 to about 99 percent by weight ethylene methacrylic/acrylic acid copolymer, about 0 to about 75 percent by weight of the second thermoplastic component (as describe above) and about 0 to about 50 percent by weight zinc oxide. In one embodiment of the present invention, the intermediate layer is formed from a blend of about 10 to 50 percent by weight ethylene methacrylic/acrylic acid copolymer, 25 to 75 percent by weight of a second thermoplastic component and about 5 to about 40 percent by weight zinc oxide. In a most preferred embodiment of the present invention, the intermediate layer is formed from a blend of about 15 to about 25 percent by weight ethylene methacrylic/acrylic acid copolymer, about 50 to about 60 percent by weight of a second thermoplastic component and about 20 to about 30 percent by weight zinc oxide. In another embodiment of the invention, the second thermoplastic component is present in the intermediate layer blend in an amount of less than 50 percent by weight, and preferably 30 to 45 percent by weight.

A specific example of a most preferred intermediate blend composition comprises about 20 percent by weight NUCREL® 960, about 57 percent by weight HYTREL® 3078 and about 23 percent by weight zinc oxide.

The intermediate layer blend preferably has a flexural modulus of less than about 10,000 psi, more preferably about 5,000 to about 8,000 psi and most preferably about 7,500 psi. Likewise, the intermediate layers employed in the golf balls of the present invention preferably have a Shore D hardness of about 35 to 50, more preferably about 37 to about 45 and most preferably about 40. In another embodiment, the intermediate layers preferably have a Shore D hardness of less than about 60, more preferably about 20 to about 60, and most preferably about 30.

Preferably, the intermediate layer and core construction employed in the present invention have a compression of less than about 65, more preferably about 50 to about 65 and most preferably about 50 to 55.

The intermediate layers employed in the golf balls of the present invention preferably have a thickness from about 0.020 inches to about 0.125 inches, more preferably about 0.035 inches to about 0.085 inches and most preferably about 0.06 inches.

In another embodiment, the thickness of the intermediate layer is about 0.025 inches to 0.125 inches, more preferably about 0.040 inches to 0.10 inches, and most preferably about 0.06 inches. The outer diameter of the intermediate layer is preferably about 1.510 inches.

The Cover Layer

The cover layer of the present invention comprises at least one layer of a thermoplastic or thermosetting material. Any number of a wide variety of cover materials may be used in the present invention such as ionomer resins, polyurethanes, balata and blends thereof, with ionomer resins being preferred.

Ionomers, such as acid-containing ethylene copolymer ionomers, include E/X/Y copolymers where E is ethylene, X is a softening comonomer such as acrylate or methacrylate present in 0–50 (preferably 0–25, most preferably 0–2), weight percent of the polymer, and Y is acrylic or methacrylic acid present in 5–35 (preferably 10–35, most preferably 15–20) weight percent of the polymer, wherein the acid moiety is neutralized 1–90% (preferably at least 40%, most preferably at least about 60%) to form an ionomer by a cation such as lithium, sodium, potassium, magnesium, calcium, barium, lead, tin, zinc or aluminum, or a combination of such cations, lithium, sodium and zinc being the most preferred. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The manner in which these ionomers are made is well known in the art as described in e.g. U.S. Pat. No. 3,262,272. As mentioned above, ionomer resins are commercially available from E. I. DuPont de Nemours and Co. of Wilmington, Del., under the tradename SURLYN®, and from Exxon Corporation of Houston, Tex., under the tradename IOTEK®.

As is well known in the art, ionomer resins may be blended in order to obtain a cover having desired characteristics. For this reason, it is preferable that the covers of the golf balls of the present invention be formed from a blend of two or more ionomer resins. A particularly preferred cover material for use in the present invention is formed from a blend of about 50 percent by weight SURLYN® 7940, about 47 percent by weight SURLYN® 8940 and about 3 percent by weight SURLYN® 8660.

The cover layers employed in the present invention preferably have a Shore D hardness of about 60 to about 72, more preferably about 65 to about 70 and most preferably about 68 to about 70.

The multi-layer golf ball of the invention can have an overall diameter of any size. Although the United States Golf Association specifications limit the minimum size of a competition golf ball to 1.680 inches in diameter or more, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The golf balls of the present invention have an overall maximum compression of about 85, preferably about 75 to about 85, more preferably about 80 to about 85 and most preferably about 82.

The golf balls of the present invention can be made by any conventional processes employed in the golf ball art. For example, the solid cores can be either injection or compression molded. The mantle layer is subsequently injection or compression molded about the core. It is important that the mantle material be able to sustain the temperatures applied during the application of the cover layer. The cover layer or layers are then injection or compression molded or cast about the mantle layer.

EXAMPLES

Example 1

Table I below provides batch compositions for intermediate layer blends for forming the novel multilayer golf balls of the present invention. However, it is to be understood that the examples are only for illustrative purposes and in no manner is the present invention limited to the specific disclosures therein.

In particular, batch numbers 2–4 provide intermediate layer blends comprising NUCREL® 960, HYTREL® 3078, and ZnO used to form the intermediate layers of the golf balls of the present invention. Batch number 1 provides a control intermediate layer blend.

TABLE I

Intermediate Layer Formulations

| Batch # | % NUCREL® 960 | % HYTREL® 3078 | % ZnO | Flexural Modulus (psi) | Specific Gravity |
|---|---|---|---|---|---|
| 1 | — | 80 | 20 | 4210 | 1.27 |
| 2 | 10 | 75 | 15 | 5560 | 1.21 |
| 3 | 20 | 70 | 10 | 7710 | 1.17 |
| 4 | 30 | 65 | 5 | 7250 | 1.14 |

Example 2

Multilayer golf balls were made having intermediate layers formed from the batch compositions set forth in Table I. Several dozen golf balls were formed using each batch composition and subsequently tested for compression, spin rate and initial velocity.

The cores of all of the multilayer balls were formed by compression molding a blend of the batch formulation set forth in Table II below. All of the cores had a diameter of 1.39 inches and were measured to have compressions ranging from about 45 to about 55 and specific gravities of from about 1.134 to about 1.146.

The intermediate layer blends of Table 1 were subsequently injection molded about the cores to form the intermediate layers of the balls having an outer diameter of about 1.51 inches.

TABLE II

Core Formulation

| Material | Parts Per Hundred |
|---|---|
| Polybutadiene (Shell 1220) | 76.0 |
| Rubber (Enichem Br40) | 24.0 |
| Pigment | 0.10 |
| Zinc Diacrylate | 24.79 |
| Calcium Oxide | 2.16 |
| Regrind | 6.47 |
| Peroxide (VAROX®) | 0.43 |
| Peroxide (EF-60) (DBDB) | 0.16 |
| Filler | 22.64 |
| Process Oil | 1.50 |

All of the multilayer balls had a cover composition formed by injection molding a blend comprising 50% SURLYN® 7940 and 50% SURLYN® 8140 about the intermediate layers and were subsequently finished using conventional clear coating and buffing techniques. The finished golf balls had an outer diameter of about 1.68 inches. These balls were tested for initial velocity, compression, cover hardness and COR, the results of such tests are set forth in Table III below.

The balls were also tested for spin rate using a True Temper Test Machine configured to strike the balls with a driver and an 8-Iron. Also tested for comparison purposes were conventional two piece "distance" balls (Titleist® HP2 Distance and Pinnacle® Gold). The test data for all of these balls is set forth in Tables III–V below.

TABLE III

| Ball | Velocity[1] (ft/s) | Compression[1] (Ball) | Weight[1] (oz) | Cover[3] Hardness (Shore D) | COR[3] (at 125 ft/s) |
|---|---|---|---|---|---|
| Pinnacle ® Gold[4] | 252.5 | 95 | 1.605 | 68 | 0.809 |
| Titleist ® HP2 Distance[4] | 253.0 | 99 | 1.600 | 71 | 0.810 |
| Ball 1 | 251.9 | 81 | 1.610 | 71 | 0.814 |
| Ball 2 | 252.3 | 84 | 1.584 | 72 | 0.814 |
| Ball 3 | 252.2 | 84 | 1.588 | 71 | 0.813 |
| Ball 4 | 251.9 | 84 | 1.590 | 69 | 0.810 |

[1]Average based on results for 12 balls
[2]Average based on results for 3 balls
[3]Average based on results for 6 balls
[4]Historical data for commercial balls

TABLE IV

Spin Rates For Driver

| Ball Type | Launch Angle (°) | Spin (rpm) | Club Speed (ft/s) |
|---|---|---|---|
| Pinnacle ® Gold | 9.1 ± 0.3 | 3032 ± 135 | 158.6 ± 0.6 |
| Titleist ® HP2 Distance | 9.0 ± 0.3 | 2977 ± 60 | 158.6 ± 1.0 |
| Ball 1 | 9.1 ± 0.5 | 2973 ± 195 | 158.4 ± 0.6 |
| Ball 2 | 9.1 ± 0.5 | 3001 ± 66 | 158.9 ± 0.7 |
| Ball 3 | 9.1 ± 0.4 | 3006 ± 121 | 158.9 ± 0.8 |
| Ball 4 | 9.0 ± 0.3 | 3007 ± 140 | 159.0 ± 0.6 |

TABLE V

Spin Rate For 8-Iron

| Ball Type | Launch Angle (°) | Spin (rpm) | Club Speed (ft/s) |
|---|---|---|---|
| Pinnacle ® Gold | 19.2 ± 0.4 | 8160 ± 218 | 116.4 ± 0.1 |
| Titleist ® HP2 Distance | 19.4 ± 0.5 | 8375 ± 171 | 116.3 ± 1.3 |
| Ball 1 | 19.2 ± 0.5 | 7970 ± 246 | 116.2 ± 0.7 |
| Ball 3 | 19.3 ± 0.2 | 7972 ± 168 | 116.5 ± 0.9 |
| Ball 4 | 19.4 ± 0.3 | 7940 ± 171 | 117.0 ± 1.3 |

As shown by results reported in Tables III–V, golf balls having an intermediate layer comprising NUCREL® 960, HYTREL® 3078, and ZnO have a high initial velocity and low spin rate. Moreover, the balls of the present invention have initial velocities approaching those of conventional two-piece "distance" balls, but have a considerably lower compression, which provides a much softer feel, more like a wound ball. Still further, these balls are easy to manufacture compared to the conventional wound ball. Thus, these balls provide the advantages of two piece "distance" balls with low spin rates and high velocity, but also provide a softer feel than such balls.

Example 3

Multilayer golf balls were made having intermediate layers formed from a blend comprising 20% NUCREL® 960, 57% HYTREL® 3078, and 23% ZnO. This intermediate layer blend was injection molded about cores formed from the batch formulation set forth in Table II. A cover was formed by injection molding a blend of 50% SURLYN® 7940, 47% SURLYN® 8940, and 3% SURLYN® 8660 around the intermediate layer and subsequently finishing the balls using conventional clear coating and buffing techniques.

The balls were tested for initial velocity, compression, cover hardness and COR, as well as for spin rate when struck by a driver and an 8-Iron using a True Temper Test Machine. The results of such tests are set forth below in Tables VI and VII below.

TABLE VI

| Velocity[1] (ft/s) | Compression[1] (Ball) | Weight[1] (oz) | Cover Hardness[2] (Shore D) | COR[3] (at 125 ft/s) | Specific Gravity |
|---|---|---|---|---|---|
| 251.5 | 82 | 1.607 | 69 | 0.801 | 1.27 |

[1]Average based on results for 12 balls
[2]Average based on results for 3 balls
[3]Average based on results for 6 balls

TABLE VII

| Club | Launch Angle (°) | Spin (rpm) | Club Speed (ft/s) |
|---|---|---|---|
| Driver | 9.2 ± 0.5 | 3015 ± 221 | 160.3 ± 0.7 |
| 8 Iron | 19.3 ± 0.6 | 7807 ± 252 | 115.6 ± 0.8 |

TABLE VIII

Mantle Layer Compositions and Properties

| | Sample | Hardness (Shore D) | Resilience (%) | Flex Modulus (psi) | Tensile Modulus (psi) | % Strain at Break |
|---|---|---|---|---|---|---|
| 1A | 0% Estane 58091 100% Estane 58861 | 28 | 54 | 1,720 | 756 | 563 |
| 1B | 25% Estane 58091 75% Estane 58861 | 34 | 41 | 2,610 | 2,438 | 626 |
| 1C | 50% Estane 58091 50% Estane 58861 | 44 | 31 | 10,360 | 10,824 | 339 |

TABLE VIII-continued

Mantle Layer Compositions and Properties

| Sample | | Hardness (Shore D) | Resilience (%) | Flex Modulus (psi) | Tensile Modulus (psi) | % Strain at Break |
|---|---|---|---|---|---|---|
| 1D | 75% Estane 58091<br>25% Estane 58861 | 61 | 34 | 43,030 | 69,918 | 149 |
| 1E | 100% Estane 58091<br>0% Estane 58861 | 78 | 46 | 147,240 | 211,288 | 10 |
| 2A | 0% Hytrel 5556<br>100% Hytrel 4078 | 40 | 47 | 8,500 | 7,071 | 527 |
| 2B | 25% Hytrel 5556<br>75% Hytrel 4078 | 43 | 51 | 10,020 | 9,726 | 441 |
| 2C | 50% Hytrel 5556<br>50% Hytrel 4078 | 45 | 47 | 12,280 | 10,741 | 399 |
| 2D | 75% Hytrel 5556<br>25% Hytrel 4078 | 48 | 53 | 13,680 | 13,164 | 374 |
| 2E | 100% Hytrel 5556<br>0% Hytrel 4078 | 48 | 52 | 12,110 | 15,231 | 347 |
| 3A | 0% Hytrel 5556<br>100% Hytrel 3078 | 30 | 62 | 3,240 | 2,078 | 810 no break |
| 3B | 25% Hytrel 5556<br>75% Hytrel 3078 | 37 | 59 | 8,170 | 5,122 | 685 |
| 3C | 50% Hytrel 5556<br>50% Hytrel 3078 | 44 | 55 | 15,320 | 10,879 | 590 |
| 3D | 75% Hytrel 5556<br>25% Hytrel 3078 | 53 | 50 | 19,870 | 16,612 | 580 |
| 3E | 100% Hytrel 5556<br>0% Hytrel 3078 | 58 | 50 | 24,840 | 17,531 | 575 |
| 4A | 0% Hytrel 4078<br>100% Pebax 4033 | 46 | 51 | 11,150 | 8,061 | 597 |
| 4B | 25% Hytrel 4078<br>75% Pebax 4033 | 46 | 53 | 10,630 | 7,769 | 644 |
| 4C | 50% Hytrel 4078<br>50% Pebax 4033 | 45 | 52 | 9,780 | 8,117 | 564 |
| 4D | 75% Hytrel 4078<br>25% Pebax 4033 | 42 | 53 | 9,310 | 7,996 | 660 |
| 4E | 100% Hytrel 4078<br>0% Pebax 4033 | 40 | 51 | 9,250 | 6,383 | 531 |
| 5A | 0% Hytrel 3078<br>100% Estane 58091 | 77 | 50 | 156,070 | 182,869 | 9 |
| 5B | 25% Hytrel 3078<br>75% Estane 58091 | 65 | 48 | 87,680 | 96,543 | 33 |
| 5C | 50% Hytrel 3078<br>50% Estane 58091 | 52 | 49 | 53,940 | 48,941 | 102 |
| 5D | 75% Hytrel 3078<br>25% Estane 58091 | 35 | 54 | 12,040 | 6,071 | 852 |
| 5E | 100% Hytrel 3078<br>0% Estane 58091 | 29 | 50 | 3,240 | 2,078 | 810 no break |
| 6A | 100% Kraton 1921<br>0% Estane 58091<br>0% Surlyn 7940 | 29 | 59 | 24,300 | 29,331 | 515 |
| 6B | 50% Kraton 1921<br>50% Estane 58091<br>0% Surlyn 7940 | 57 | 49 | 56,580 | — | 145 |
| 6C | 50% Kraton 1921<br>0% Estane 58091<br>50% Surlyn 7940 | 56 | 55 | 28,290 | 28,760 | 295 |
| 7A | 33.3% Pebax 4033<br>33.3% Estane 58091<br>33.3% Hytrel 3078 | 48 | 50 | 41,240 | 30,032 | 294 |
| 7B | 30% Pebax 4033<br>40% Estane 58091<br>10% Hytrel 3078 | 48 | 50 | 30,650 | 14,220 | 566 |
| 7C | 20% Pebax 4033<br>40% Estane 58091<br>40% Hytrel 3078 | 41 | 54 | 24,020 | 16,630 | 512 |

The term "about," as used herein in connection with one or more numbers or numerical ranges, should be understood to refer to all such numbers, including all numbers in a range.

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising:
a core, a cover, and at least one intermediate layer disposed between the core and the cover, wherein the intermediate layer is formed from a composition comprising at least one thermoplastic or thermoset polyurethane material, wherein the intermediate layer has a specific gravity of at least about 1.14, and wherein the golf ball has a compression of about 85 or less.

2. The golf ball of claim 1, wherein the cover has a hardness of about 60 to about 72 Shore D.

3. The golf ball of claim 1, wherein the intermediate layer has a hardness of about 35 to about 60 Shore D.

4. The golf ball of claim 3, wherein the cover hardness and the intermediate layer hardness have a first ratio from about 1.2 to about 2.1.

5. The golf ball of claim 3, wherein the core has a hardness such that a second ratio of the intermediate layer hardness to the core hardness is about 0.64 to about 0.91.

6. The golf ball of claim 5, wherein the core hardness is less than about 80 Shore C.

7. The golf ball of claim 1, wherein the intermediate layer has a Shore D hardness of about 37 to about 45 and a flexural modulus of at least about 10,000 psi.

8. The golf ball of claim 1, wherein the composition comprises thermoplastic polyurethane material.

9. The golf ball of claim 1, wherein the intermediate layer composition further comprises an ethylene methacrylic/acrylic acid copolymer.

10. The golf ball of claim 1, wherein the intermediate layer further comprises additional thermoplastic material selected from the group consisting of polyesterester block copolymers, polyetherester block copolymers, polyetheramide block copolymers, ionomer resins, dynamically vulcanized thermoplastic elastomers, styrene-butadiene elastomers with functional groups comprising maleic anhydride or sulfonic acid, thermoplastic polyesters, polymers formed using a metallocene catalyst, and mixtures thereof.

11. The golf ball of claim 1, wherein the thermoplastic or thermoset polyurethane material is present in an amount from about 25 to about 75 percent by weight.

12. The golf ball of claim 1, wherein the composition further comprises a second thermoplastic or thermoset polyurethane.

13. The golf ball of claim 1, wherein the intermediate layer has a thickness no greater than about 0.125 inches.

14. The golf ball of claim 1, wherein the intermediate layer has a hardness of about 78 Shore D or less.

15. The golf ball of claim 1, wherein the intermediate layer has a specific gravity of greater than 1.2.

16. The golf ball of claim 1, wherein the composition further comprises a density-adjusting filler.

17. The golf ball of claim 16, wherein the filler comprises barium sulfate, zinc oxide, titanium dioxide, and mixtures thereof.

18. The golf ball of claim 17, wherein the filler comprises zinc oxide present in an amount from about 5 to about 40 weight percent.

19. The golf ball of claim 1, wherein the core has a specific gravity of about 1 to about 1.2.

20. The golf ball of claim 1, wherein the core has a diameter of no greater than about 1.51 inches.

21. The golf ball of claim 1, wherein the core has a Shore C hardness of less than about 80.

22. The golf ball of claim 1, wherein the core comprises a blend of polybutadiene and calcium oxide, and the at least one intermediate layer comprises the polyurethane material present in an amount of about 25 to about 75 weight percent, a copolymer of ethylene and methacrylic acid present in an amount from about 10 to about 50 weight percent, and zinc oxide present in an amount from about 20 to about 30 weight percent.

23. The golf ball of claim 1, wherein the cover comprises a blend of at least one ionomer.

24. A golf ball comprising:
a core, a cover, and at least one intermediate layer disposed between the core and the cover, wherein
the core has a hardness of less than about 80 Shore C; and
the intermediate layer is formed from a blend comprising a thermoplastic polyurethane material, wherein the golf ball has a compression of about 75 to about 85, and wherein the intermediate layer has a hardness of between about 35 and about 50 Shore D.

25. The golf ball of claim 24, wherein the cover has a hardness of about 60 to about 72 Shore D.

26. The golf ball of claim 24, wherein the core has a Bashore resilience of about 30 to about 80.

27. The golf ball of claim 26, wherein the core resilience is about 40 to about 70.

28. The golf ball of claim 24, wherein the intermediate layer has a Bashore resilience of about 35 to about 75.

29. The golf ball of claim 28, wherein the intermediate layer resilience is about 60 to about 70.

30. A golf ball comprising a solid core, an intermediate layer, and a cover, wherein the solid core has a diameter of about 1.25 to about 1.51 inches and a specific gravity of about 1 to about 1.2;
wherein the intermediate layer comprises a polyurethane resin and has a hardness of about 20 to about 60 Shore D and a specific gravity of greater than about 1.2 and greater than that of the solid core; and
wherein the cover comprises an ionomer resin and has a thickness greater than about 0.04 inches and a hardness of about 60 to about 72 Shore D.

31. The golf ball of claim 30, wherein the core diameter is about 1.3 to about 1.48 inches.

32. The golf ball of claim 30, wherein the intermediate layer has a specific gravity of about 1.21 to about 1.3.

33. The golf ball of claim 32, wherein the intermediate layer has a specific gravity of about 1.23 to about 1.29.

34. The golf ball of claim 30, wherein the cover thickness is about 0.04 to about 0.41 inches.

35. The golf ball of claim 30, wherein the intermediate layer has a thickness of about 0.02 to about 0.125 inches.

36. The golf ball of claim 30, wherein the intermediate layer has a diameter of about 1.27 to about 1.64 inches.

37. A golf ball comprising:
a core;
a cover comprising at least one layer;
at least one intermediate layer disposed between the core and the cover and being formed of a composition comprising at least one thermoset polyurethane material, wherein the intermediate layer has a Shore D hardness of less than about 60.

38. The golf ball of claim 37, wherein the core has an outer diameter of about 1.25 inches to about 1.63 inches.

39. The golf ball of claim 37, wherein the ratio of the cover material hardness to the intermediate layer material hardness is greater than about 1.

40. The golf ball of claim 37, wherein the cover material hardness is about 68 to 72 Shore D.

41. The golf ball of claim 37, wherein the golf ball compression is from about 75 to about 85.

42. The golf ball of claim 1, wherein the golf ball compression is from about 75 to about 85.

43. The golf ball of claim 1, wherein the cover is formed from a composition comprising thermoset or thermoplastic material.

44. The golf ball of claim 43, wherein the cover has a hardness of about 60 to about 70 Shore D.

45. The golf ball of claim 43, wherein the cover is formed of at least one ionomer, and wherein the at least one ionomer is a copolymer of ethylene and methacrylic acid.

46. The golf ball of claim 43, wherein the first composition further comprises a density-adjusting filler.

47. The golf ball of claim 46, wherein the first composition further comprises a copolymer of ethylene and methacrylic acid present in an amount from about 10 to about 50 weight percent, wherein the polyurethane material present in an amount from about 25 to about 75 weight percent, and wherein the density-adjusting filler is present in an amount from about 20 to about 30 weight percent.

48. The golf ball of claim 43, wherein the core comprises a blend of polybutadiene and calcium oxide.

49. The golf ball of claim 43, wherein the core has a hardness of less than about 80 Shore C.

* * * * *